(12) United States Patent
Isozumi et al.

(10) Patent No.: US 8,777,823 B2
(45) Date of Patent: Jul. 15, 2014

(54) AUTOMATIC TOOL CHANGER

(75) Inventors: George Isozumi, Chiryu (JP); Kazuya Furukawa, Chiryu (JP); Kazuyoshi Nagato, Chiryu (JP); Masaki Kato, Chiryu (JP)

(73) Assignee: Fuji Machine Mfg. Co., Ltd., Chiryu-shi (JP)

( * ) Notice: Subject to any disclaimer, the term of this patent is extended or adjusted under 35 U.S.C. 154(b) by 883 days.

(21) Appl. No.: 12/918,006

(22) PCT Filed: Feb. 5, 2009

(86) PCT No.: PCT/JP2009/051953
§ 371 (c)(1),
(2), (4) Date: Nov. 12, 2010

(87) PCT Pub. No.: WO2009/107467
PCT Pub. Date: Sep. 3, 2009

(65) Prior Publication Data
US 2011/0201484 A1 Aug. 18, 2011

(30) Foreign Application Priority Data
Feb. 25, 2008 (JP) .................................. 2008-042765

(51) Int. Cl.
*B23B 29/24* (2006.01)
(52) U.S. Cl.
USPC ............................................. 483/44; 483/39
(58) Field of Classification Search
USPC ..................................................... 483/39, 44
See application file for complete search history.

(56) References Cited

U.S. PATENT DOCUMENTS

| | | | | |
|---|---|---|---|---|
| 5,337,623 A * | 8/1994 | Huang et al. | ................. | 74/813 R |
| 5,752,905 A * | 5/1998 | Yan et al. | ......................... | 483/44 |
| 6,601,470 B2 * | 8/2003 | Kato | ............................... | 74/567 |
| 6,637,290 B2 * | 10/2003 | Kato | ............................... | 74/569 |
| 7,070,549 B1 * | 7/2006 | Sun | .................................... | 483/7 |

FOREIGN PATENT DOCUMENTS

| | | |
|---|---|---|
| JP | 61-164743 A | 7/1986 |
| JP | 2000-126967 A | 5/2000 |
| JP | 2000-126969 A | 5/2000 |

* cited by examiner

*Primary Examiner* — David Bryant
*Assistant Examiner* — Jason L Vaughan
(74) *Attorney, Agent, or Firm* — Foley & Lardner LLP (57) ABSTRACT

Disclosed in an automatic tool changer in which the tool changing time can be shortened by increasing overlapping operations of the turning operation and the axial advancing/retracting operation of a replacement arm. An arm driver (32) is so constituted that the driver performs overlapping operations such that at least a part of the operation for turning a replacement arm (23) by 180° and the operation for advancing/retracting the replacement arm in the axial direction in order to insert or withdraw a tool (37) are performed simultaneously and in parallelism with each other. When the replacement arm (23) is advanced/retracted in the axial direction in order to insert or withdraw a tool, the replacement arm (23) is turned by a predetermined distance in a direction reverse to the direction (so called "normal direction") for turning the arm by 180° in parallelism with the advancing/retracting operation, and thereafter, the replacement arm (23) is turned in the normal direction.

3 Claims, 7 Drawing Sheets

AUTOMATIC TOOL CHANGER

TECHNICAL FIELD

The present invention relates to an automatic tool changer for use with a drilling machine or the like.

BACKGROUND ART

A drilling machine or the like which bores workpieces using a plurality of tools is provided with a tool stocker holding a plurality of tools each one of which is mounted in a tapered hole of a tool spindle. A necessary machining such as boring is carried out for workpiece while tools are sequentially changed between the tool spindle and the tool stocker according to respective portions of the workpiece to be machined.

An automatic tool changer generally comprises a tool-changing arm having grippers which are provided on both ends thereof respectively and are adapted to simultaneously grip a tool mounted in the tapered hole of the tool spindle and another tool set on a tool change location of the tool stocker respectively. The tool-changing arm is turnable and movable axially. In the tool change, the tool-changing arm is turned by a predetermined angle in the positive direction so that the tools at both tool spindle and tool stocker sides are simultaneously gripped by the grippers provided at both ends of the tool-changing arm, respectively. The tool-changing arm is then moved axially forward so that both gripped tools are taken out of the tool spindle and the tool stocker side respectively. Subsequently, the tool-changing arm is turned 180° and axially retreated so that both tools are attached to the tool spindle and tool stocker sides respectively. The tool-changing arm is finally turned by the predetermined angle in the reverse direction thereby to be returned to an original position (initial position).

The automatic tool changer as described above includes a type in which the turning and the axial movement of the tool-changing arm are mechanically worked together by a cam mechanism in order that the tool-changing arm may be operated quickly and smoothly, as described by patent document 1 (JP-A-2000-126969). In the automatic tool changer as constructed above, part of turning of a tool change shaft and part of the axial movement thereof are overlapped with each other so that a tool-changing time is reduced.

More specifically, the turning of the tool-changing arm starts in the midst of a tool pullout operation so that tools are prevented from interference with the tapered hole of the tool spindle or the like, and a tool inserting operation by the tool-changing arm also starts in the middle of the 180°-turn of the tool-changing arm, so that the tool-changing time is shortened by the overlap of the turning operation and the axial reciprocation of the tool-changing arm.

Patent document 1: JP-A-2000-126969

DISCLOSURE OF THE INVENTION

Problem to be Overcome by the Invention

However, when the turning and axial movement of shafts of the tool-changing arm are viewed individually, it is hard to say that a sufficient amount of overlap is ensured in the case where a movement distance is short. A stop time is long currently, and it is insufficient that a movement locus of the tool follows a shortest path. Further reduction in the tool-changing time has been desired.

Accordingly, a problem to be overcome by the present invention is to provide an automatic tool changer which can increase the overlap of the turning and the axial reciprocation of the tool-changing arm and can reduce the tool-changing time.

Means for Overcoming the Problem

To overcome the above-described problem, the present invention provides an automatic tool changer comprising a tool-changing arm which is turnable and axially movable forward and backward and changes tools between a tool spindle and a tool-changing position, and an arm drive device which turns and axially moves the tool-changing arm, wherein the arm drive device is configured to execute parallel operation in which a turning operation for turning the tool-changing arm by 180° and a forward and backward moving operation for axially moving the tool-changing arm forward and backward in order to insert in and remove the tools from the tool spindle are executed so that at least part of the turning operation and at least part of the forward and backward moving operation are simultaneously executed in parallel; and when the tool-changing arm is moved forward and backward in a tool-inserting direction to remove the tools, the tool-changing arm is turned by a predetermined amount of movement in a direction opposite to a positive direction in which the tool-changing arm is turned by 180° and thereafter, the tool-changing arm is turned in the positive direction.

According to the above-described construction, when the 180°-turning operation of the tool-changing arm and the forward/backward moving operation of the tool-changing arm overlap each other in the tool pullout operation of the too-changing arm, the tool-changing arm is turned by the predetermined amount of movement in the direction opposite the positive direction in which the tool-changing arm is turned 180° and is thereafter turned in the positive direction. Accordingly, the tool-changing arm can sufficiently be accelerated in the positive direction until reaching a tool withdrawing position where the tool-changing arm is turnable. This can increase the speed at which the tool-changing arm passes through an interference point such as a tapered hole of the tool spindle. Consequently, the time loss due to deceleration and acceleration near the interference point can be reduced to a maximum extent, whereby a time period required for the change of tools can be reduced.

Furthermore, in the invention, in a tool inserting operation of the tool-changing arm, the tool-changing arm is overshot by an alternating moving amount from a 180°-turn and thereafter, the tool-changing arm is turned in a reverse direction. Consequently, since a time for decelerating the tool-changing arm is increased, the time loss due to deceleration near the interference point can be reduced.

Furthermore, an axially forward/backward movement stroke of the tool-changing arm is larger than a length through which the tool is removed, so that the tool-changing arm is turned by 180° while the tool is inserted and removed continuously without stop. As a result, the time period required for the change of tools can further be reduced.

Furthermore, the arm drive device comprises a cam mechanism including a rotating cam rotated by an electric motor. As a result, a reduction in the tool changing time can easily be realized by suitably setting a cam configuration of the rotating cam without necessitating any special control.

EXPLANATION OF REFERENCE SYMBOLS

10 . . . automatic tool changer, 11 . . . housing, 12 . . . input shaft, 13 . . . rib, 14 . . . roller-gear cam, 15 . . . electric motor, 16 . . . turret, 18 . . . follower roller, 20 . . . tool-changing shaft, 23 . . . tool-changing arm, 25 . . . cam groove, 26 . . . swing lever, 31 . . . cam mechanism, 32 . . . arm drive device, 35 . . . tool spindle, 37 . . . tool, 51, 52 . . . gripping claw, 53 . . . tool stocker and 54 . . . tool pot.

BEST MODE FOR CARRYING OUT THE INVENTION

Figure 1:
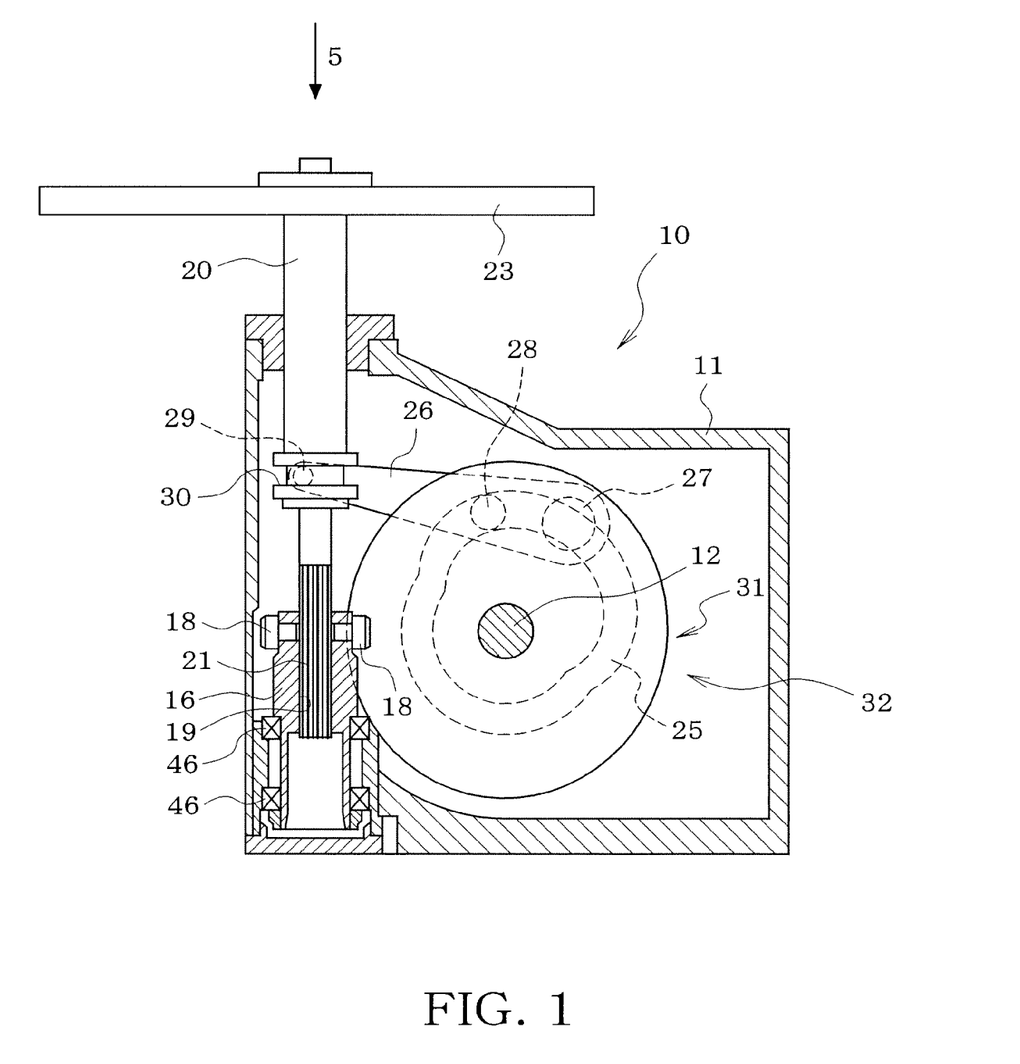
FIG. 1 is a partially broken plan view of an automatic tool changer in accordance with a first embodiment of the present invention.
Figure 2:
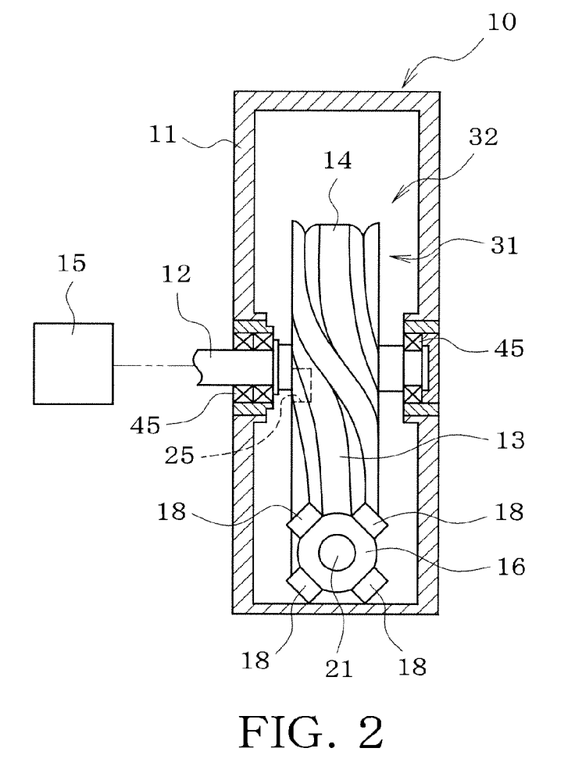
FIG. 2 is a partially broken side view of the automatic tool changer.

A first embodiment of the present invention will now be described with reference to FIGS. 1 to 8. FIGS. 1 and 2 show an automatic tool changer 10 applied to a drilling center or the like. The automatic tool changer 10 includes a box-like housing 11 in which an input shaft 12 is rotatably mounted via a bearing 45. The input shaft 12 is fixed a roller-gear cam 14 which has an outer periphery formed with a rib 13 and serves as a rotating cam. The input shaft 12 is connected via a belt transmission mechanism or the like to an electric motor 15. The roller-gear cam 14 is rotated at a constant speed in one direction by rotation of the electric motor 15.

A turret 16 is mounted on a bearing 46 further mounted on the housing 11 so as to be rotatable about an axis at right angles to the input shaft 12. A plurality of follower rollers 18 is disposed on an outer periphery of the turret 16 at an equi-angular interval. The follower rollers 18 are mounted so as to be rotatable about an axis perpendicular to a rotation axis of the turret 16. Each follower roller 18 is mesh engaged with the rib 13 of the roller-gear cam 14 thereby to rotate the turret 16 in the positive or reverse direction by the rotation of the roller-gear cam 14 or to hold the turret 16 in a stopped state.

A spline bore 19 is formed in a center of rotation of the turret 16. A tool-changing shaft 20 has a spline 21 formed on an outer periphery of a rear end thereof. The spline 21 is fitted with the spline bore 19 so as to be only slidable in the direction of the rotating axis of the turret 16. The tool-changing shaft 20 has a distal end protruding out of the housing 11, and a tool-changing arm 23 is integrally mounted on a protruding end of the tool-changing shaft 20.

A swing lever 26 is mounted, at a lengthwise end thereof, on a support shaft 27 in the housing 11 so as to be swingable about an axis parallel to the input shaft 12. The swing lever 26 has a lengthwise middle portion on which a follower roller 28 is rotatably mounted. The follower roller 28 is engaged with the cam groove 25 formed in one end of the roller-gear cam 14. The swing lever 26 has the other lengthwise end on which an engagement roller 29 is held. The engagement roller 29 is engaged with an annular engagement groove 30 provided in the tool-changing shaft 20. The tool-changing shaft 20 is moved forward/backward by the swinging of the swing lever 26 or is held in a stopped state.

When the roller-gear cam 14 is rotated by the motor 15 in the above-described construction, the follower roller 28 is moved along the cam groove 25 such that the swing lever 26 is swung. As the result of the swinging of the swing lever 26, the tool-changing shaft 20 is axially moved forward and backward by the engagement roller 29 engaged with the engagement groove 30 of the tool-changing shaft 20, and simultaneously, as the result of rotation of the roller-gear cam 14, the turret 16 is rotated by the follower roller 18 in mesh engagement with the rib 13, whereby the tool-changing shaft 20 is rotatively moved in the positive or reverse direction.

More specifically, both axial reciprocal movement and turning movement are imparted to the tool-changing shaft 20 in conjunction with each other according to the shapes of the rib 13 of the roller-gear cam 14 and the cam groove 25, whereupon a sequence of tool changing operation is carried out by one turn of the roller-gear cam 14. The above-described roller-gear cam 14 formed with the rib 13 and the cam groove 25, turret 16, swing lever 26 and the like constitute an arm drive device 32 comprising a cam mechanism 31 which turns and axially moves the tool-changing arm 23.

Figure 3:
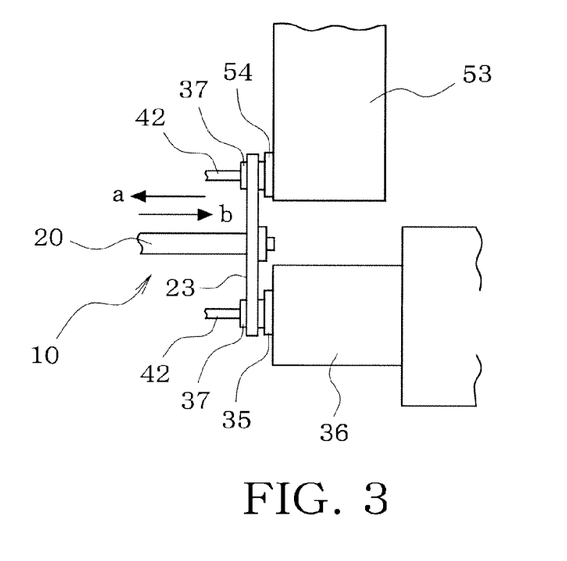
FIG. 3 shows the automatic tool changer which executes tool change between a tool spindle and a tool stocker.
Figure 4:
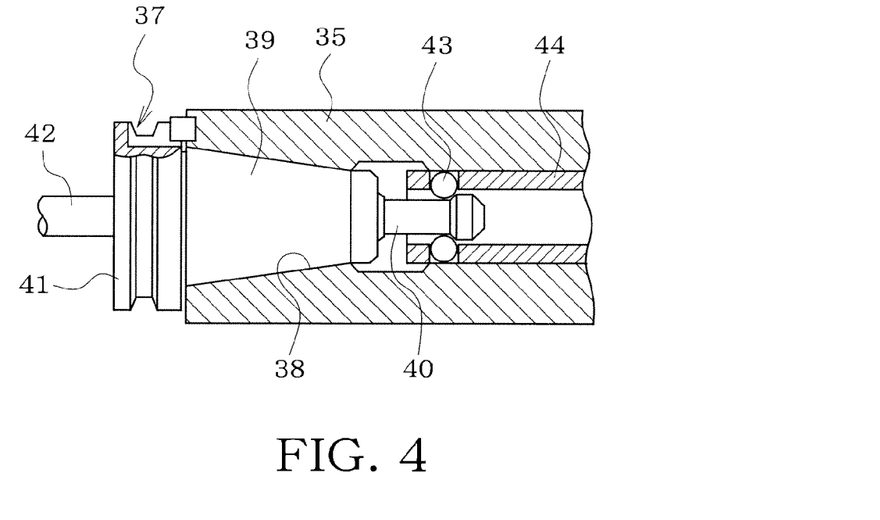
FIG. 4 is a sectional view of the tool spindle having a tapered hole into which a tool is inserted.

In FIGS. 3 and 4, a tool spindle 35 is rotatably supported on a spindle head (not shown) which is movable in a three-dimensional direction relative to the workpiece. The tool spindle 35 is formed with a tapered hole 38 to which a tool 37 (or the tool holder) is detachably attached. The tool 37 has a taper shank 39 which is fitted with the tapered hole 38. A pull stud 40 is integrally connected to a small-diameter side end of the taper shank 39. The taper shank 39 has a larger-diameter side end which is provided with a flange 41 formed with an annular groove. The flange 41 is adapted to be gripped by the tool-changing arm 23. The flange 41 has a distal end on which various types of drills 42 and the like are mounted.

An engaging member 44 is inserted into the tool spindle 35 so as to be axially movable. A plurality of engagement balls 43 is supported by the engaging member 44 so as to be radially movable. The engagement balls 43 are detachably attachable to the pull stud 40 of the tool 37. A drawn bar (not shown) is provided in the tool spindle 35 so as to be axially movable. The drawn bar has a distal end on which the engaging member 44 is integrally mounted. The drawn bar is biased backward by a clamping spring comprising a disc spring. The taper shank 39 of the tool 37 is adapted to be clamped in the tapered hole 38. In addition, the drawn bar is moved in the forward direction by the unclamping cylinder against the biasing force of the clamping spring to press the rear of the pull stud 40, thereby releasing the tool 37 from the clamped state.

Figure 5:
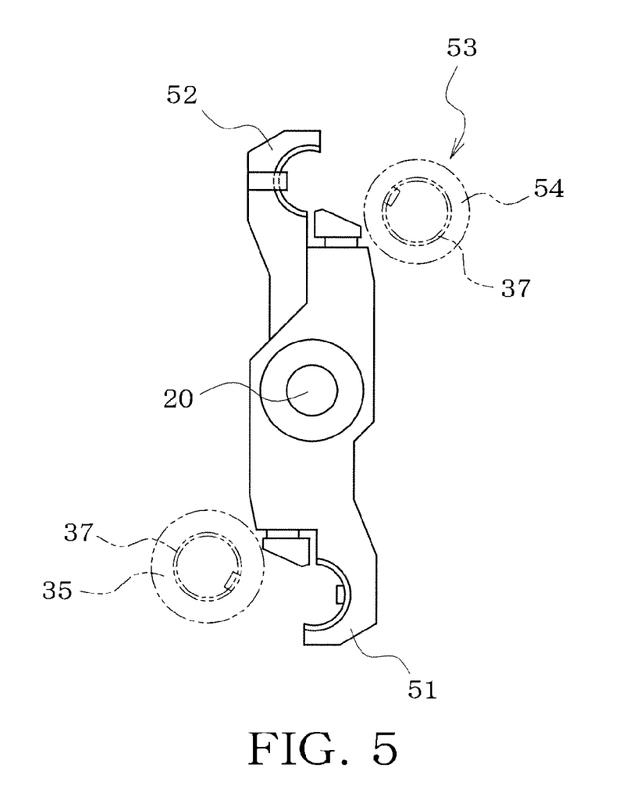
FIG. 5 is a view of the tool-changing arm as viewed in the direction of arrow 5 in FIG. 1.

The tool-changing arm 23 has two ends provided with gripping claws 51 and 52 which grip tools, respectively, as shown in FIG. 5. When the tool-changing arm 23 is turned in the positive direction by a predetermined angle (30°, for example), one gripping claw 51 grips the flange 41 of the tool 37 attached to the tool spindle 35 assuming a predetermined position, and the other gripping claw 52 grips the flange 41 of the tool 37 attached to a tool pot 54 set at a tool changing position of the tool stocker 53.

When the tool-changing arm 23 is moved axially backward by a predetermined stroke in the direction of arrow a in FIG. 3 while gripping the tools 37 by the gripping claws 51 and 52 respectively (the state as shown in FIG. 3), the tools 37 gripped by the respective gripping claws 51 and 52 are pulled from the tool spindle 35 and the tool pot 54 of the tool stocker 53 respectively. Subsequently, when the tool-changing arm 23 is turned by 180°, the tool 37 attached to the tool spindle 35 is transferred to the tool pot 54 side, and simultaneously, the tool 37 attached to the tool pot 54 is transferred to the tool spindle 35 side. Thereafter, when the tool-changing arm 23 is moved forward by a predetermined stroke axially in the direction of arrow b in FIG. 3, the tools 37 gripped by the gripping claws 51 and 52 are attached to the tool spindle 35 and the tool pot 54, respectively. Subsequently, the tool-changing arm 23 is moved in the reverse direction by a predetermined angle (30°, for example), thereby returning to the original (standby) position.

In the above-described sequential tool changing operation, the automatic tool changer 10 is constructed and arranged to execute an overlap operation in which at least parts of the turning operation and the axial forward/backward movement are simultaneously carried out in parallel, whereupon a tool changing time is shortened by the overlap operation. The following will describe overlapping the turning operation and axial forward/backward movement operation of the tool-changing arm 23 in the first embodiment with reference to FIGS. 6 and 7.

The tool changing operation includes (I) a tool pullout operation of moving the tool-changing arm 23 backward by a predetermined stroke while the tools 37 are gripped by both gripping claws 51 and 52 of the tool-changing arm 23, thereby pulling the tools 37 from the tapered hole 38 of the tool spindle 35 and the tool pot 54 of the tool stocker 53, respectively, (II) a turning operation of turning the tool-changing arm 23 by 180° in order that the tools 37 gripped by both gripping claws 51 and 52 may simultaneously be transferred from the tool spindle 35 side to the tool stocker 53 side and from the tool stocker 53 side to the tool spindle 35 side respectively, and (III) a tool inserting and attaching operation of axially moving the tool-changing arm 23 forward by a predetermined stroke so that the tools 37 are inserted into and attached to the tapered hole 38 of the tool spindle 35 and the tool pot 34 of the tool stocker 53.

Figure 6:
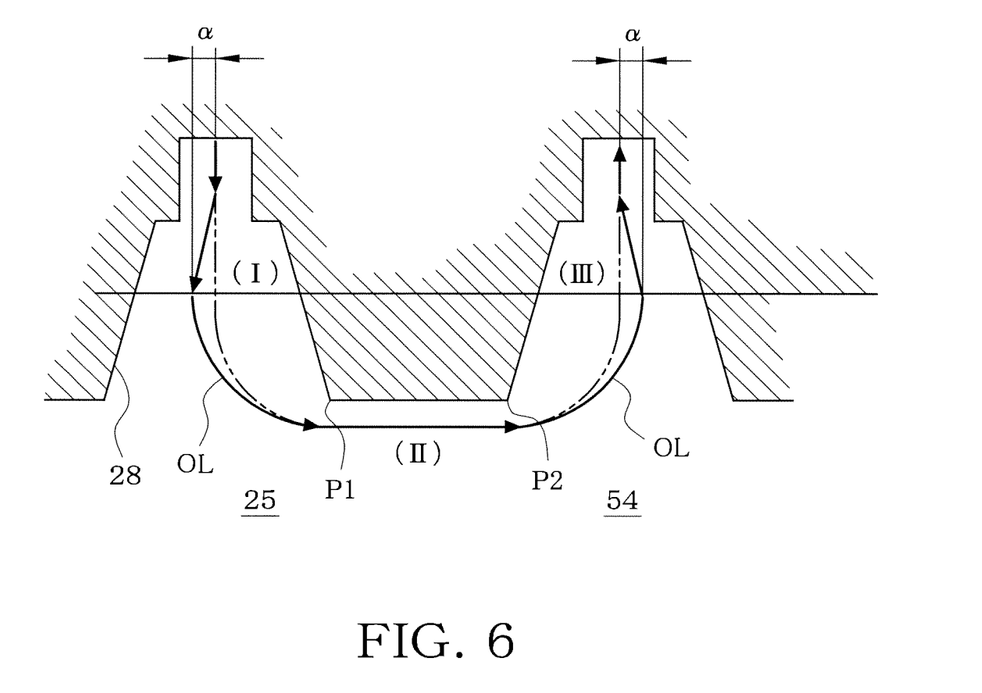
FIG. 6 schematically explains a movement locus of the tool in the tool change.

Conventionally, as shown by alternate long and two short dashes line in FIG. 6, a shortest path is followed by an overlap operation OL in which the turning operation (II) starts at the end of the tool pullout operation (I) so that the tool 37 and the tool spindle 35 and the like are prevented from interfering with each other, and the tool inserting and attaching operation (III) starts at the end of the turning operation (II), whereby the tool changing time is reduced. However, a sufficient amount of overlap operation cannot be ensured when the movement distance is short. Thus, there is a definite limit in reduction of working time.

So, in the first embodiment, as shown by solid line in FIG. 6, the tool-changing arm 23 is turned by a predetermined amount of movement a in the direction opposite the direction of the 180°-turn so that the tool 37 is prevented from interfering with the tool spindle 35 and the tool pot 54 of the tool stocker 53, and thereafter, the rotational direction of the tool-changing arm 23 is changed to the positive direction (direction of 180°-turn). Thus, the tool-changing arm 23 is sufficiently accelerated until reaching a tool pullout position where the tool-changing arm 23 is turnable, whereby the speed at which the tool-changing arm 23 passes through the interference point P1 can be increased to an allowed maximum speed.

Figure 7:
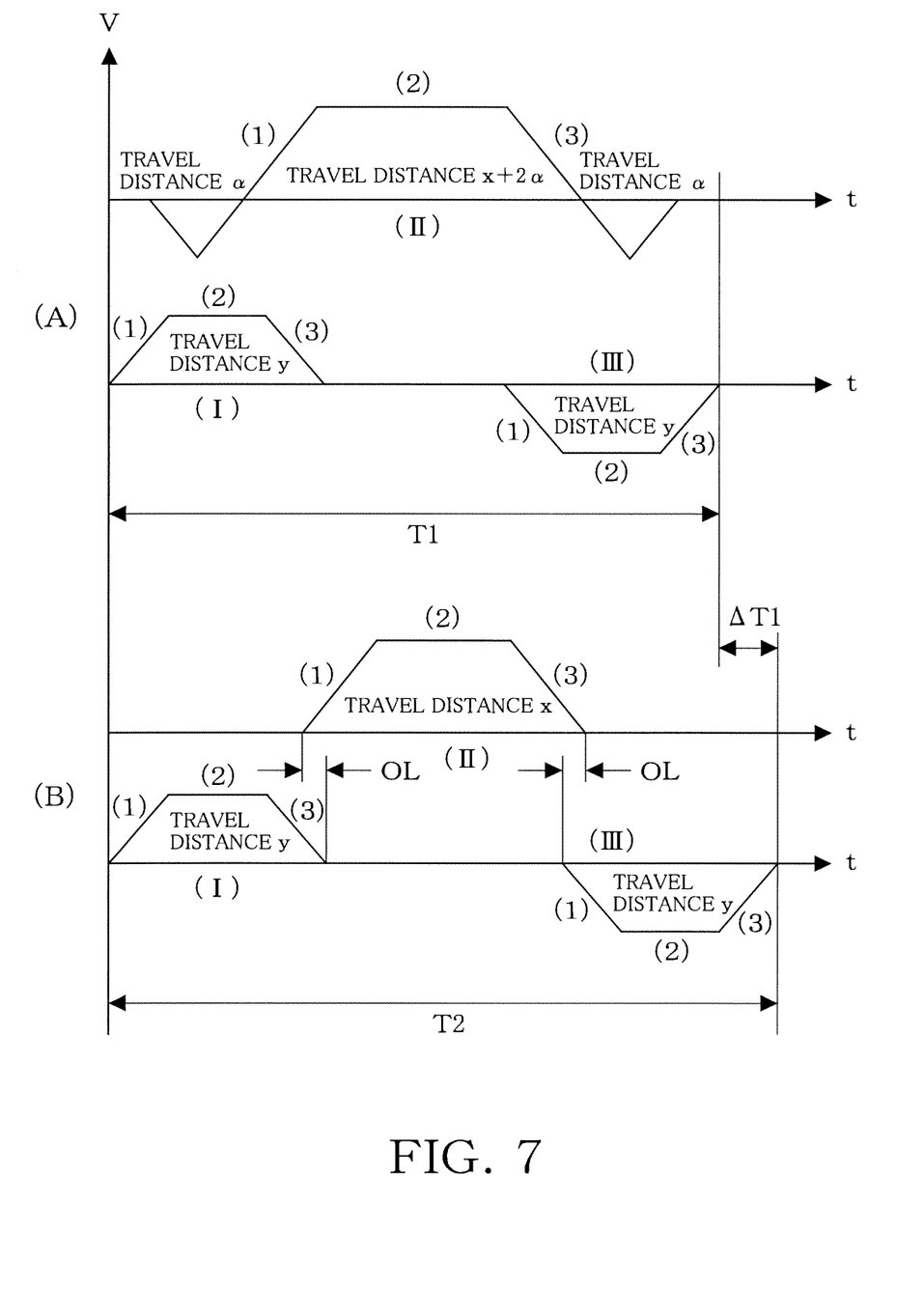
FIG. 7 is a time-chart showing an overlap operation of the turning movement and axial movement of the tool-changing arm in the first embodiment.

The above-described operation will now be explained with reference to the timechart of FIG. 7. The vertical axis denotes speed V and the horizontal axis denotes time t in FIG. 7. Each of the pullout operation (I), turning operation (II) and tool inserting and attaching operation (III) is accelerated at a predetermined acceleration. When a predetermined maximum speed has been reached, the tool-changing arm 23 is changed to a constant speed and decelerated before the end point to be stopped at a predetermined position. The speed of the tool-changing arm 23 is thus controlled. In FIG. 7, parenthesized numeral (1) designates an acceleration region, parenthesized numeral (2) designates a constant speed region and parenthesized numeral (3) designates a deceleration region. FIG. 7 further show that the tool pullout operation (I) and the tool insertion operation (II) have the respective movement directions opposed to each other.

In the conventional overlap operation OL, as shown in FIG. 7(B), the tool-changing arm starts to be accelerated in the turning direction when decelerated at the end of the tool pullout operation (I), and the tool-changing arm starts to be accelerated in the tool inserting direction when decelerated at the end of the turning operation (II) thereof.

On the other hand, in the first embodiment, the tool-changing arm 23 starts to be moved in the tool pullout operation (I) while being accelerated at a predetermined acceleration, and the tool-changing arm 23 is maintained at a constant speed after having reached a maximum speed, as shown in FIG. 7(A). The tool-changing arm 23 is decelerated before the tool pullout position, thereafter reaching the tool pullout position. In the turning operation (II), the tool-changing arm 23 is turned in the direction opposite the 180°-turning (positive) direction after having started to pull out the tool. After having been turned by a predetermined travel distance α, the turning direction is changed to the positive direction and the tool-changing arm 23 is then accelerated. Thus, when turned in the reverse direction by the predetermined travel distance α, the tool-changing arm 23 can sufficiently be accelerated until arrival at the tool pullout position where the tool-changing arm 23 is turnable. As a result, the turning speed in the case where the tool-changing arm 23 passes through the interference point P1 can be increased to an allowable maximum speed. When the tool-changing arm 23 is set so as to complete the tool pullout operation when the maximum turning speed has been reached, the constant speed range of the turning operation of the tool-changing arm 23 can be rendered longer. Consequently, although the tool-changing arm 23 has the same axial travel distance y as in the conventional construction, a turning travel distance of the tool-changing arm 23 is increased to (x+2 α) which is larger by double travel distance α.

Figure 8:
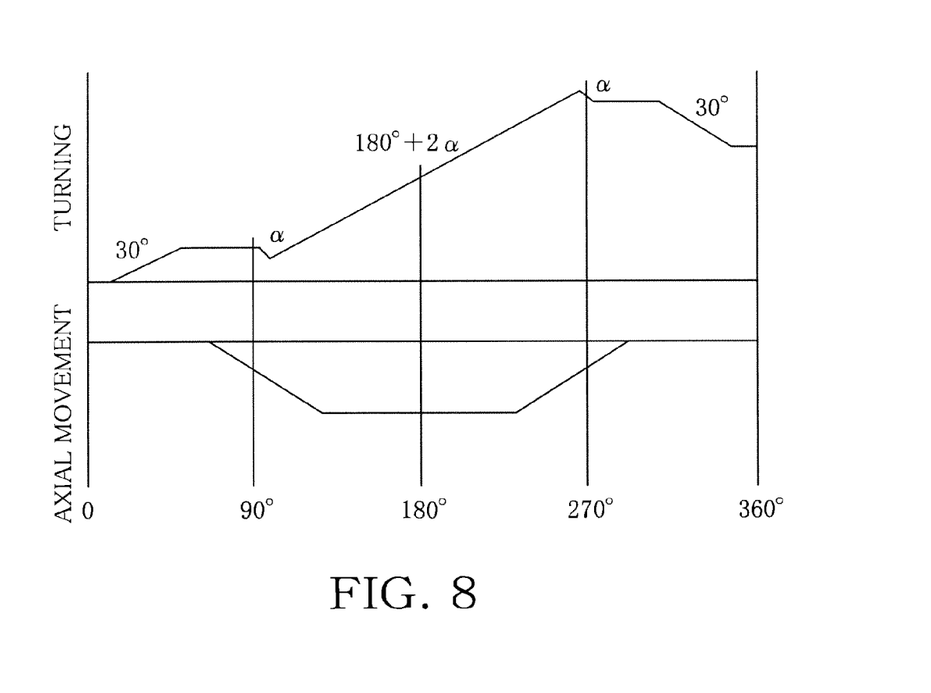
FIG. 8 shows the characteristics of the turning and the axial movement of the tool-changing arm.

In order to realize the above-described parallel operation of the turning operation and the forward and backward movement operation, elements including the rib 13 of the roller-gear cam 14 comprising the cam mechanism 31 and the cam groove 25 are formed into their respective necessary shapes, and the turning operation and the forward and backward movement of the tool-changing arm 23 are adapted to be executed so that the characteristics as shown in FIG. 8 are achieved. A sequence of tool-changing operation is completed with a 360°-turn of the roller-gear cam 14. FIG. 8 exemplifies the turning operations of the tool-changing arm 23, or for example, a 30°-turn in the positive direction, a 180°-turn in the positive direction, and a 30°-turn in the reverse direction.

The tool-changing arm 23 is turned by 180° and moved in the reverse direction by the predetermined travel distance a in such a manner that the tool 37 and the tool spindle 35 and the like are prevented from interfering with each other, as described above. Consequently, an amount of time of the overlap operation can be rendered longer and accordingly, a waiting time can be shortened. As a result, when the overlap operations of the conventional technique and the first embodiment are compared with each other under the conditions of predetermined acceleration and predetermined maximum speed, the overlap operation of the first embodiment can reduce the tool changing time by $\Delta T1(=T2-T1)$ as compared with the conventional overlap operation, as shown in FIG. 7. Although the reduced time T1 obtained by an initial tool change is relatively shorter, the reduced time T1 can sufficiently contribute to the reduction in the working time since tool exchange is normally carried out at a plurality of times for machining workpieces.

The tool-changing arm 23 is overshot by the predetermined travel distance α so as to pass through the interference point P2 at the maximum speed when the turning of the tool-changing arm 23 is finished, so that the center of the tool 37 corresponds with the tapered hole 38 of the tool spindle 35 and the central position of the tool pot 54 of the tool stocker 53. As a result, an amount of time necessary for decelerating the tool-changing arm 23 from the maximum speed can be increased.

Thus, the tool-changing arm 23 is turned in the positive direction by the turning angle of (180°±2 α) obtained by adding double travel distance α to the predetermined travel distance. Thereafter, the tool-changing arm 23 is turned in the reverse direction by the predetermined travel distance, whereby the tools 37 are transferred between the tool spindle 35 and the tool stocker 53. However, a cycle time necessary for tool change can be reduced as the result of increase in the overlap operation.

Figure 9:
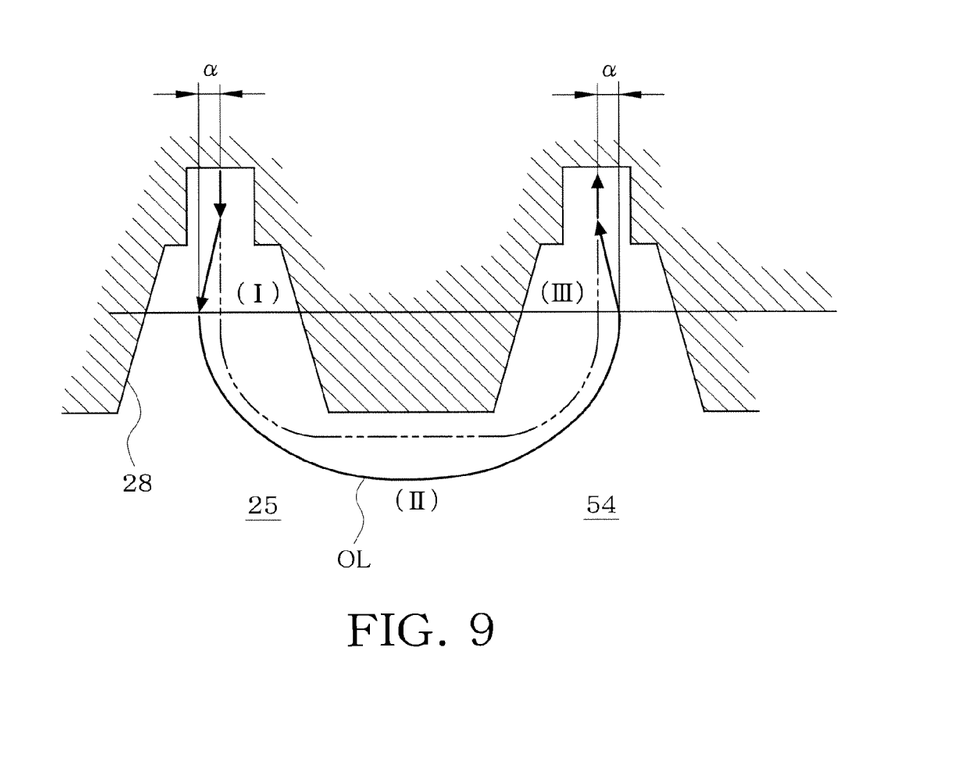
FIG. 9 schematically explains the movement locus of the tool in the tool change by the automatic tool changer in accordance with a second embodiment of the invention.
Figure 10:
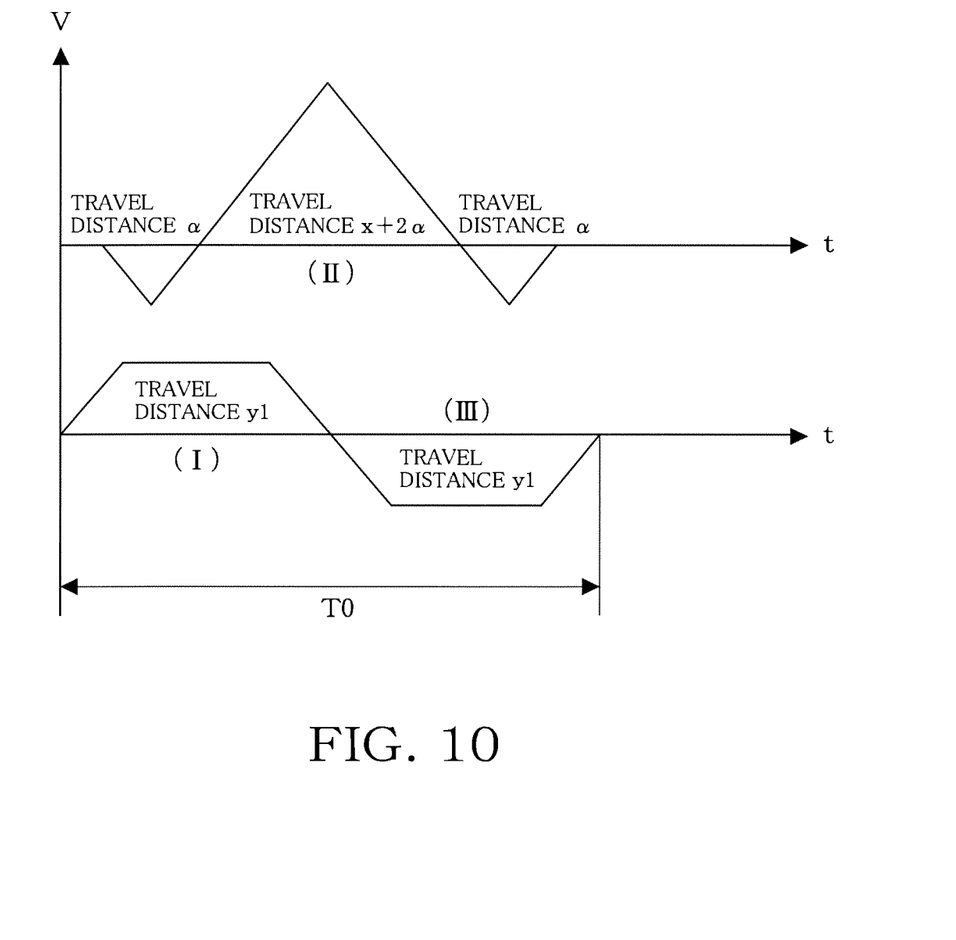
FIG. 10 is a time chart showing the overlap operation of the turning movement and axial movement of the tool-changing arm in the second embodiment.

FIGS. 9 and 10 illustrate a second embodiment. In the second embodiment, the tool-changing arm 23 is turned in the reverse direction to the direction of 180°-turn in the turning operation in the same manner as in the first embodiment. The difference of the second embodiment from the first embodiment is as follows. An amount of operation stroke (amount of axial movement) in each of the tool pullout operation (I) and the tool inserting operation (III) is increased so as to be equal to or larger than the stroke the tool-changing arm 23 needs to pull out the tool 37, whereby the tool-changing arm 23 is operated so as to be located at the tool pullout side over the normal tool pullout position during the turning operation of the tool-changing arm. Consequently, the tool inserting operation is accelerated until the tool-changing arm 23 reaches the position where the tool is insertable, whereupon the speed at which the tool-changing arm 23 assuming a tool insertable position is moved in the tool insertion direction is increased, whereby further reduction in the tool changing time amount can be achieved.

More specifically, the tool-changing arm 23 is overshot not only in the turning direction but also in the axial direction in the second embodiment, so that the tool pullout operation and the tool insertion operation can be executed continuously without interrupt. And in this period, the tool-changing arm 23 is turned by the predetermined travel distance α in the reverse direction to the direction of 180°-turn, and thereafter, the turning direction is changed to the positive direction, and the tool-changing arm 23 is turned so as to reach the maximum speed while being accelerated. Subsequently, the tool-changing arm 23 is decelerated and overshot by the predetermined travel distance α. The tool-changing arm 23 is finally turned in the reverse direction by the predetermined travel distance α so that the center of the tool 37 corresponds with the tapered hole 38 of the tool spindle 35 and the central position of the tool pot 54 of the tool stocker 53.

In the second embodiment constructed above, the cycle time of the tool change can be reduced to T0 that is further shorter than T1 referred to in the first embodiment although the acceleration and maximum speed of the tool-changing arm 23 in the 180°-turn need to be higher than in the first embodiment.

In each of the foregoing embodiments, the tools 37 are directly changed by the tool-changing arm 23 between the tool spindle 35 and the tool pot 54 set at the tool change position of the tool stocker 53. However, the tool pot may be provided at an intermediate tool change position between the tool stocker 53 and tool spindle 35, and the tools 37 may be changed between the intermediate tool change position and the tool spindle 35. Thus, the embodiments should not be limited to the direct change between the tool spindle 35 and the tool stocker 53.

Furthermore, the rib 13 and cam groove 25 of the cam mechanism 31 are formed on the outer periphery and in the end surface of the roller-gear cam 14 in the foregoing embodiments respectively. However, the rib 13 and the cam groove 25 may be formed on individual rotating cams which are rotated by an electric motor 15 together or in a synchronous manner, respectively.

Furthermore, in each embodiment, the turning operation and the axial forward/rearward movement of the tool-changing arm 23 are mechanically worked with each other by the arm drive device 32 comprising the cam mechanism 31. However, the arm drive device 32 may be arranged to execute the turning operation and the axial forward/rearward movement of the tool-changing shaft 20 with a servomotor serving as a drive source by a simultaneous biaxial control.

Furthermore, in each embodiment, when turned 180°, the tool-changing arm 23 is turned in the reverse direction to the 180°-turn thereof by the predetermined travel distance α and thereafter, the tool-changing arm 23 is turned in the positive direction. However, the reverse direction and the positive direction should not be limited to respective specific directions, but an alternating movement is merely carried out in the reverse direction to the 180°-turn of the tool-changing arm 23.

The embodiments have been described but should not be restricted by the specific constructions and arrangements. The embodiments may be modified into various forms without departure from the gist of the invention.

The invention claimed is:

1. An automatic tool changer comprising:
a tool-changing shaft configured to turn a tool-changing arm, the tool-changing arm being configured to turn so as to move forward and backward in a direction of the tool-changing shaft and to change tools in a tool spindle in a tool-changing position, and
an arm drive device configured to turn in the direction of the tool-changing shaft and to move the tool-changing arm,
wherein the arm drive device is configured to execute a parallel operation comprising:
a turning operation so as to turn the tool-changing arm by 180°, and
a forward and backward moving operation so as to move the tool-changing arm forward and backward in a tool inserting direction to permit the tools to be inserted in and removed from the tool spindle, wherein at least part of the turning operation and at least part of the forward and backward moving operation are configured to be simultaneously executed in parallel, and wherein when the tool-changing arm is moved forward and backward in the tool inserting direction to remove the tools, the tool-changing arm is configured to be turned by a predetermined amount of movement in a direction opposite to a positive direction in which the tool-changing arm is turned by 180°, and thereafter turned in the positive direction, and wherein the arm drive device comprises a cam mechanism including a roller-gear cam configured to be rotated by an electric motor.

2. The automatic tool changer according to claim 1, wherein in a tool inserting operation of the tool-changing arm, the tool-changing arm is configured to be turned so as to be overshot by the predetermined amount of movement from an angle with respect to the tool inserting direction, and wherein the tool-changing arm is thereafter configured to be turned by the predetermined amount in a reverse direction opposite the positive direction so as to be moved in the tool inserting direction.

3. The automatic tool changer according to claim 1, wherein a movement forward and backward in the tool inserting direction is a stroke of the tool-changing arm that is larger than a length through which the tool is removed, so that the tool-changing arm is turned by 180° while the tool is inserted and removed continuously without stopping.

* * * * *